United States Patent
Waratani et al.

(10) Patent No.: US 8,786,818 B2
(45) Date of Patent: Jul. 22, 2014

(54) LIQUID CRYSTAL DISPLAY PANEL HAVING PARTICULAR LAMINATED SPACER

(75) Inventors: Yusuke Waratani, Osaka (JP); Takaya Uno, Osaka (JP); Yoshitaka Okumoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 187 days.

(21) Appl. No.: 13/580,818

(22) PCT Filed: Jan. 6, 2011

(86) PCT No.: PCT/JP2011/050113
§ 371 (c)(1),
(2), (4) Date: Oct. 2, 2012

(87) PCT Pub. No.: WO2011/105117
PCT Pub. Date: Sep. 1, 2011

(65) Prior Publication Data
US 2013/0016317 A1    Jan. 17, 2013

(30) Foreign Application Priority Data
Feb. 24, 2010    (JP) .................................. 2010-039304

(51) Int. Cl.
*G02F 1/1339* (2006.01)
*G02F 1/1333* (2006.01)
*G02F 1/1335* (2006.01)

(52) U.S. Cl.
USPC ............................ 349/155; 349/162; 349/106

(58) Field of Classification Search
CPC ............ G02F 1/13394; G02F 1/13392; G02F 1/133512; G02F 1/133555; G02F 1/133711; G02F 1/133516
USPC .......................................... 349/155, 162, 106
See application file for complete search history.

(56) References Cited

U.S. PATENT DOCUMENTS

| 5,757,451 A | * | 5/1998 | Miyazaki et al. ............. 349/106 |
| 6,275,280 B1 | * | 8/2001 | Kajita et al. .................. 349/155 |
| 2006/0017872 A1 | * | 1/2006 | Tokuda et al. ................ 349/122 |

FOREIGN PATENT DOCUMENTS

| JP | 9-80447 A | | 3/1997 | |
| JP | 10177109 A | * | 6/1998 | ............... G02B 5/20 |
| JP | H10-177109 | | 6/1998 | |
| JP | H10-282333 A | | 10/1998 | |
| JP | 2002-98824 A | | 4/2002 | |
| JP | 2002-116534 A | | 4/2002 | |
| JP | 2003-156751 A | | 5/2003 | |

(Continued)

*Primary Examiner* — Mike Qi
(74) *Attorney, Agent, or Firm* — Chen Yoshimura LLP (57) ABSTRACT

Disclosed is a liquid crystal display panel that can minimize the occurrence of short circuits (leaks) between the pair of substrates even if a certain amount of pressing force is applied to the substrates. A liquid crystal display panel of the present invention is provided with a pair of substrates and a liquid crystal layer sandwiched between the pair of substrates, such that one of the pair of substrates is provided with a support substrate, a laminated spacer formed by laminating three or more resin layers including transparent colored layers, and an electrode that covers the laminated spacer; the other of the pair of substrates is provided with a support substrate and electrodes; and the degree of deformation of the topmost resin layer of the three or more resin layers is at most 5% of the degree of deformation of the entire laminated spacer, when a certain amount of pressing force is applied to the support substrate supporting the laminated spacer.

7 Claims, 8 Drawing Sheets

(56) References Cited

FOREIGN PATENT DOCUMENTS

| JP | 2005-345666 A | 12/2005 |
| JP | 2006-30906 A | 2/2006 |
| JP | 2006-30907 A | 2/2006 |
| JP | 2006-338032 A | 12/2006 |
| JP | 2007-57746 A | 3/2007 |
| JP | 2007-279192 A | 10/2007 |
| JP | 2009-204839 A | 9/2009 |

* cited by examiner

LIQUID CRYSTAL DISPLAY PANEL HAVING PARTICULAR LAMINATED SPACER

TECHNICAL FIELD

The present invention relates to a liquid crystal display panel, and more particularly, to a liquid crystal display panel that uses a laminated structure of color filters as a spacer.

BACKGROUND ART

Liquid crystal display (LCD) devices have a configuration in which a liquid crystal layer is sandwiched between a pair of substrates. Liquid crystal display devices display images by changing the orientation state of liquid crystal molecules by having electrodes formed on the substrates apply a voltage to the liquid crystal layer, thus changing the polarization state of light passing through the liquid crystal layer. In a liquid crystal display panel, color filters of a plurality of colors are formed in one of the pair of substrates in order to display colors.

The pair of substrates, which sandwich the liquid crystal layer, are maintained at a uniform gap (cell gap) as a result of spacers, and are bonded to each other by a sealing material. An example of the spacer is a transparent bead-type spacer, but when spacers of this type are unevenly scattered, this could result in a decrease in contrast. Therefore, columnar spacers are sometimes used (see Patent Documents 1 to 4, for example). For the columnar spacer, a spacer that is formed by laminating color filters used in the pixel area is sometimes used. Examples of other techniques for forming columnar spacers are as follows.

One known method is to use a black matrix in addition to the color filters so as to guarantee that the height of the spacer is sufficient, when forming the columnar spacer using the color filters (see Patent Document 5, for example).

Another known method is to not provide a gap between the color filters used in the pixel area and the color filters used in the spacer so as to give a sufficient thickness to the color filters, when forming the columnar spacer using the color filters (see Patent Document 6, for example).

Another known method is to constitute a photospacer of two layers, with the lower layer softer than the upper layer, so as not to allow color unevenness or the like to happen even if a load is applied to localized areas when the liquid crystal display panel is being used (see Patent Document 7, for example).

Another known method is to use a dry film with a prescribed hardness as the material for the color filters that constitute the spacer so as to reduce the occurrence of display unevenness by minimizing variation in spacer height (see Patent Document 8, for example).

Another known method is to form two types of spacers with different heights in order to disperse excessive load on the panel, in addition to the conventional purpose of the spacers (see Patent Document 9, for example).

Another known method is to have the black matrix have at least a prescribed hardness in order to minimize the occurrence of display defects resulting from damage to the transparent electrode film when pressing force is applied to the columnar spacers (see Patent Document 10, for example).

RELATED ART DOCUMENTS

Patent Documents

Patent Document 1: Japanese Patent Application Laid-Open Publication No. H10-282333

Patent Document 2: Japanese Patent Application Laid-Open Publication No. 2002-98824

Patent Document 3: Japanese Patent Application Laid-Open Publication No. 2002-116534

Patent Document 4: Japanese Patent Application Laid-Open Publication No. 2006-338032

Patent Document 5: Japanese Patent Application Laid-Open Publication No. H10-177109

Patent Document 6: Japanese Patent Application Laid-Open Publication No. 2003-156751

Patent Document 7: Japanese Patent Application Laid-Open Publication No. 2005-345666

Patent Document 8: Japanese Patent Application Laid-Open Publication No. 2006-30907

Patent Document 9: Japanese Patent Application Laid-Open Publication No. 2007-279192

Patent Document 10: Japanese Patent Application Laid-Open Publication No. 2007-57746

SUMMARY OF THE INVENTION

Problems to be Solved by the Invention

The inventors of the present invention have conducted studies on spacers formed by laminating resin layers (hereinafter referred to as a laminated spacer) such as color filters and a black matrix, as spacers that maintain a gap between a pair of substrates that sandwich a liquid crystal layer. The inventors of the present invention thus discovered that with conventional laminated spacers, when a certain amount of pressing force is applied to the substrate that supports the laminated spacers, there were cases in which the laminated spacers would be crushed, causing electrodes provided in each of the pair of substrates to have a short circuit (leak) with one another, thus causing display defects.

Figure 13:
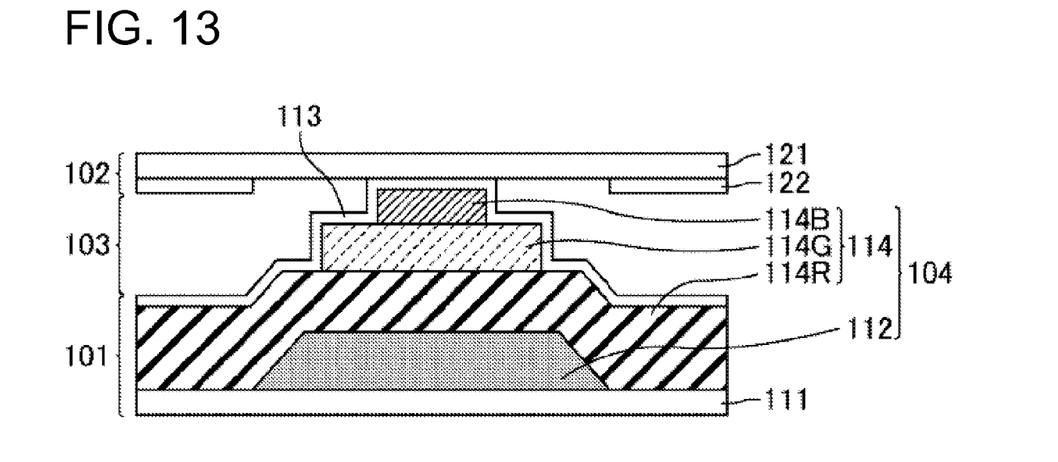
FIG. 13 is a schematic drawing that shows a cross-section of a laminated spacer of a liquid crystal display panel that the inventors of the present invention have been studying.

FIG. 13 is a schematic drawing that shows the cross-section of the laminated spacer of a liquid crystal display panel that the inventors of the present invention have been studying. As shown in FIG. 13, a laminated spacer 104 has a configuration in which a black matrix (BM) 112, a red color filter (R) 114 R, a green color filter (G) 114 G, and a blue color filter (B) 114 B are laminated in this order starting from the side of a support substrate 111. The upper surfaces and side surfaces of the laminated spacer 104 are covered by a common electrode 113, which is formed at the same time as forming a common electrode on the color filters of the pixel aperture area. In an opposite substrate 102, pixel electrodes 122 are provided side by side with a prescribed gap therebetween on a support substrate 121.

Figure 14:
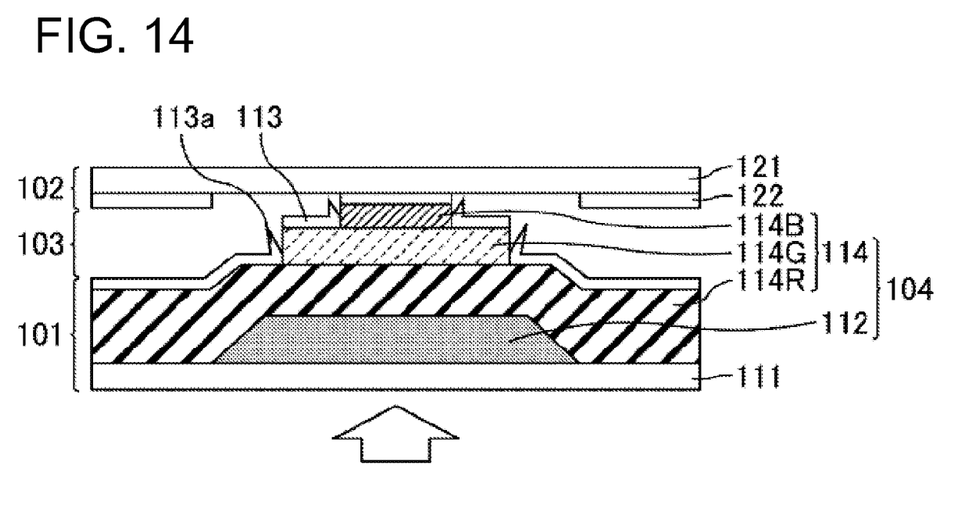
FIG. 14 is a cross-sectional schematic drawing that shows a situation in which cracks have formed in a common electrode after a certain amount of pressing force is applied to the laminated spacer.

FIG. 14 is a cross-sectional schematic drawing that shows a situation in which cracks appear in the common electrode after a certain amount of pressing force was applied to the laminated spacer. When a pressing force at or above a certain amount is applied to a color filter substrate 101 in the direction indicated by the arrow in FIG. 14, the laminated spacer is crushed and each layer (B, G, R, BM) sinks. As a result, as shown in FIG. 14, the surface of the color filter substrate 101 in contact with the opposite substrate 102, or in other words the surface of the common electrode 113, becomes cracked or peeled. As a result, a structure 113a (hereinafter referred to as cracked parts) in which parts of the common electrode 113 stick out is formed.

As shown in FIGS. 13 and 14, in the liquid crystal display panel currently being considered, respective layers that constitute the laminated spacer 104 are formed such that the lower layers are wider than the upper layers. Also, because the common electrode 113 is formed on the laminated spacer 104, the common electrode 113 on the laminated spacer 104 and the pixel electrodes 122 are designed to have a prescribed gap therebetween so as to prevent leaks between the common electrode 113 and the pixel electrodes 122.

If the laminated spacer 104 is crushed, the distance between the common electrode 113 and the pixel electrodes 122 becomes shorter in the vertical direction, which means that parts of the common electrode 113 formed at or above the second layer from the top may come into contact with the pixel electrodes 122. Also, even if a sufficient distance in the vertical direction is guaranteed, if misalignment occurs between the substrates, for example, the cracked parts 113a, which are formed when the common electrode 113 on the topmost layer of the laminated spacer 104 is damaged, may come into contact with the pixel electrodes 122.

One way to deal with this is to form an insulating layer of at least a prescribed thickness on the common electrode 113, but this adds an extra manufacturing step.

The present invention takes into account the above problems, and aims to provide a liquid crystal display panel that can minimize the occurrence of short circuits (leaks) between the pair of substrates even if a certain amount of pressing force is applied to the substrates.

Means for Solving the Problems

When studying various aspects of the deformation of the laminated spacers, the inventors of the present invention paid particular attention to the degree of deformation of the top two layers out of those that constitute the laminated spacer. The inventors of the present invention discovered that if the proportion of deformation of the top two layers of the laminated spacer is greater than a certain proportion and if the damage to the electrode on these layers is great, then a leak is likely to occur between the pair of substrates.

Upon diligent study, the inventors of the present invention have discovered that the occurrence of leaks between the pair of substrates could be reduced by decreasing the degree of deformation of the upper layers and having much of the deformation concentrated in the lower layers, among the plurality of layers that constitute the laminated spacer. Specifically, by having the lower layers have a greater degree of deformation than that of the higher layers, the upper layers sink into the lower layers, and therefore, the electrode formed on the upper layers is less susceptible to cracks. Even if cracks do occur in the electrode formed on the lower layers, the opposite substrate is high enough above the cracks.

The inventors of the present invention have focused particularly on the degree of deformation of the top two resin layers when the laminated spacer has three or more resin layers laminated together. Upon considering a situation in which a certain amount of pressing force is applied to a substrate by a finger, it was found that occurrences of short circuits between the pair of substrates can be effectively prevented if at least one of the following conditions is fulfilled: (1) the topmost resin layer of the three or more resin layers has a degree of deformation of at most 5% of the degree of deformation of the entire laminated spacer; and (2) the second resin layer from the top among the three or more resin layers has a degree of deformation of at most 15% of the degree of deformation of the entire laminated spacer.

The inventors of the present invention have thus discovered that they could solve the above issue, and have arrived at the present invention.

In other words, the present invention is a liquid crystal display panel (hereinafter referred to as the first liquid crystal display panel) that includes a pair of substrates and a liquid crystal layer sandwiched between the pair of substrates, wherein one of the pair of substrates includes a support substrate, a laminated spacer formed by laminating three or more resin layers including a transparent colored layer, and an electrode that covers the laminated spacer, wherein the other of the pair of substrates includes a support substrate and electrodes, and wherein a degree of deformation of a topmost resin layer of the three or more resin layers is at most 5% of a degree of deformation of the laminated spacer as a whole, when a certain amount of pressing force is applied to the support substrate supporting the laminated spacer.

The present invention is also a liquid crystal display panel (hereinafter referred to as the second liquid crystal display panel) that includes a pair of substrates and a liquid crystal layer sandwiched between the pair of substrates, wherein one of the pair of substrates includes a support substrate, a laminated spacer formed by laminating three or more resin layers including a transparent colored layer, and an electrode that covers the laminated spacer, wherein the other of the pair of substrates includes a support substrate and electrodes, and wherein a degree of deformation of a second resin layer from the top of the three or more resin layers is at most 15% of a degree of deformation of the laminated spacer as a whole, when a certain amount of pressing force is applied to the support substrate supporting the laminated spacer.

The first and second liquid crystal display panels of the present invention will be described below in detail, but first, the parts in common between the liquid crystal display panels will be described.

The first and second liquid crystal display panels of the present invention are provided with a pair of substrates and a liquid crystal layer sandwiched between the pair of substrates. In terms of the pair of substrates, one substrate can be used as a color filter substrate and the other can be used as an array substrate, for example. A color filter including R (red), G (green), and B (blue), for example, may be disposed on the color filter substrate, and by adjusting the balance of the respective colors, various colors can be displayed. A plurality of pixel electrodes may be provided in the array substrate so as to correspond to the color filter, which allows the orientation of the liquid crystals to be controlled on the level of a color unit (subpixel unit) that overlaps with each pixel electrode.

One of the pair of substrates is provided with a support substrate, a laminated spacer formed by laminating three or more resin layers including the transparent colored layers, and an electrode that covers the laminated spacer. By using a laminated spacer constituted of a plurality of resin layers such as the transparent colored layers (color filters) as the spacer for maintaining the thickness of the liquid crystal layer, the manufacturing process is made more efficient. By forming the electrode integrally with the electrode on the laminated spacer, a need to perform an additional patterning step is eliminated. There is no special limitation on the types of resin layers that constitute the laminated spacer, and in addition to the color filters and the black matrix used in the pixel aperture area, other resin layers may be stacked on as necessary.

The other of the pair of substrates is provided with a support substrate and electrodes. In other words, the liquid crystal display panel of the present invention has a pair of electrodes that sandwich the liquid crystal layer. As a result, it is possible to form an electric field in the liquid crystal layer and adjust the orientation of the liquid crystal molecules depending on the size of the voltage.

The characteristics of the first liquid crystal display panel of the present invention will be described. (1) When a certain amount of pressing force is applied to the support substrate supporting the laminated spacer, the degree of deformation of the topmost resin layer of the three or more resin layers is at most 5% of the degree of deformation of the entire laminated spacer. As a result, the distance between the electrode located on the topmost resin layer of the laminated spacer and the surface of the opposite substrate can be prevented from shrinking, the susceptibility of the electrode on the topmost resin layer of the laminated spacer to cracking can be made low, and the possibility of a short circuit occurring between the electrodes provided on each of the pair of substrates can be reduced. By avoiding defects due to short circuits, the production output can be kept high.

The characteristics of the second liquid crystal display panel of the present invention will be described. (2) When a certain amount of pressing force is applied to the support substrate supporting the laminated spacer, the degree of deformation of the second resin layer from the top of the three or more resin layers is at most 15% of the degree of deformation of the entire laminated spacer. As a result, the distance between the electrode located on the second resin layer from the top of the laminated spacer and the surface of the opposite substrate can be prevented from shrinking, the susceptibility of the electrode on the second resin layer from the top of the laminated spacer to cracking can be made low, and the possibility of a short circuit occurring between the electrodes provided on each of the pair of substrates can be reduced. By avoiding defects due to short circuits, the production output can be kept high.

As long as these constituting elements are included as primary components in the configuration of the liquid crystal display panel of the present invention, there is no special limitation on other constituting elements.

One example of adjusting the degree of deformation is to adjust the hardness of each resin layer. The harder the resin layer is, the lower the degree of deformation thereof is, and the softer the resin layer is, the higher the degree of deformation thereof is. Therefore, it is preferable that the resin layers towards the top of the three or more resin layers be harder than the resin layers towards the bottom of the three or more resin layers.

The liquid crystal display panel of the present invention needs to fulfill one of the above conditions (1) and (2), but it is preferable for both (1) and (2) to be fulfilled. In other words, in the first liquid crystal display panel of the present invention, the degree of deformation of the second resin layer from the top of the three or more resin layers is preferably at most 15% of the degree of deformation of the entire laminated spacer when a certain amount of pressing force is applied to the support substrate supporting the laminated spacer. In the second liquid crystal display panel of the present invention, the degree of deformation of the topmost resin layer of the three or more resin layers is preferably at most 5% of the degree of deformation of the entire laminated spacer when applying a certain amount of pressing force to the support substrate supporting the laminated spacer. With this configuration, it is possible to more securely prevent the occurrence of short circuits between the pair of substrates.

The topmost resin layer of the three or more resin layers is preferably located within the inter-electrode region in the other of the pair of substrates when viewing the surface of the support substrate supporting the laminated spacer from the normal direction. With this configuration, the electrode located on the topmost resin layer of the three or more resin layers can be more securely prevented from coming into contact with the electrodes in the opposite substrate.

The second resin layer from the top of the three or more resin layers is preferably located within the inter-electrode region in the other of the pair of substrates when viewing the surface of support substrate supporting the laminated spacer from the normal direction. With this configuration, the electrode located on the second resin layer from the top of the three or more resin layers can be more securely prevented from coming into contact with the electrodes in the opposite substrate. In this case, the resin layers towards the top of the three or more resin layers are preferably harder than the resin layers towards the bottom.

The proportion of deformation of the resin layers towards the top of the three or more resin layers is preferably smaller than the proportion of deformation of the resin layers towards the bottom. With this configuration, it is possible to effectively reduce the occurrence of cracks in a part of the electrode closer to the opposite substrate, and it is possible to more reliably prevent the part of the electrode on the resin layer closer to the opposite substrate from coming closer to the surface of the opposite substrate. In this case, the resin layers towards the top of the three or more resin layers are preferably harder than the resin layers towards the bottom.

The preferred examples of the present invention can be combined, and by doing so, leaks between the pair of substrates can be prevented more reliably.

Effects of the Invention

The liquid crystal display panel of the present invention can prevent short circuits between electrodes provided in each of the pair of substrates.

BRIEF DESCRIPTION OF THE DRAWINGS

FIG. 4 is a cross-sectional drawing that schematically shows the result of pressure being applied to the top part of a laminated spacer when a display surface of a liquid crystal display panel of Embodiment 1 is strongly pressed by a finger of a viewer or the like.

FIG. 5 is a cross-sectional drawing that schematically shows the result of pressure being applied to the top part of a laminated spacer when a display surface of a liquid crystal display panel of Embodiment 2 is strongly pressed by a finger of a viewer or the like.

FIG. 6 is a cross-sectional drawing that schematically shows the result of pressure being applied to the top part of a laminated spacer when a display surface of a liquid crystal display panel of Comparison Example 1 is strongly pressed by a finger of a viewer or the like.

FIG. 7 is a cross-sectional drawing that schematically shows the result of pressure being applied to the top part of a laminated spacer when a display surface of a liquid crystal display panel of Comparison Example 2 is strongly pressed by a finger of a viewer or the like.

FIG. 9 is a cross-sectional drawing that schematically shows the result of pressure being applied to the top part of a laminated spacer when a display surface of a liquid crystal display panel of Embodiment 3 is strongly pressed by a finger of a viewer or the like.

FIG. 10 is a cross-sectional drawing that schematically shows the result of pressure being applied to the top part of a laminated spacer when a display surface of a liquid crystal display panel of Comparison Example 3 is strongly pressed by a finger of a viewer or the like.

DETAILED DESCRIPTION OF EMBODIMENTS

Embodiments will be given below and the present invention will be described in further detail with reference to drawings, but the present invention is not limited to these embodiments.

In the present specification, the "proportion of deformation" refers to the proportion of the degree of deformation of each resin layer to that of the entire laminated spacer.

Embodiment Mode 1

Figure 1:
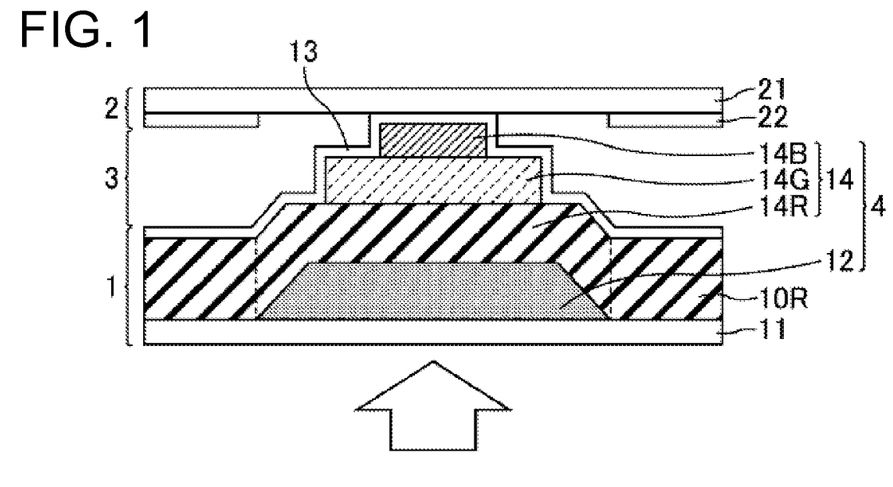
FIG. 1 is a schematic drawing that shows a cross-section of a liquid crystal display panel of Embodiment mode 1.

FIG. 1 is a schematic drawing that shows the cross-section of a liquid crystal display panel of Embodiment mode 1. As shown in FIG. 1, the liquid crystal display panel of the present embodiment mode has a configuration in which a liquid crystal layer 3 is sandwiched between a pair of substrates 1 and 2. A laminated spacer 4 is provided as a member that controls the gap between the pair of substrates 1 and 2. The laminated spacer 4 is formed in a color filter substrate 1.

The liquid crystal display panel of the present embodiment mode can be applied to any mode such as VA mode or TN mode as long as the pair of substrates each have electrodes.

As shown in FIG. 1, the color filter substrate 1 is provided with a support substrate 11 such as a glass substrate, the laminated spacer 4 in which a light-shielding layer 12 and a plurality of transparent colored layers 14 are laminated, and a common electrode 13 that covers the laminated spacer 4. In the present embodiment, an opposite substrate 2 is a thin film transistor array substrate, and is provided with a support substrate 21 and pixel electrodes 22. The respective pixel electrodes 22 are disposed in a plurality of locations so as to correspond to the locations of the color filters in the pixel aperture area, and the respective pixel electrodes have a prescribed gap therebetween.

Figure 2:
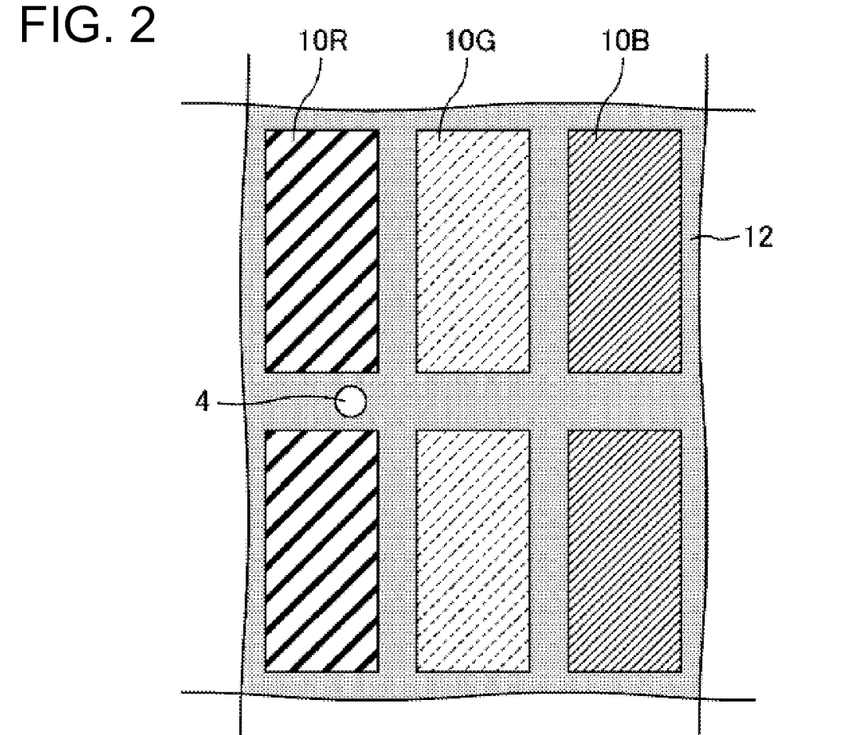
FIG. 2 is a schematic plan view that shows a display surface of the liquid crystal display panel of Embodiment mode 1.

FIG. 2 is a schematic plan view that shows the display surface of the liquid crystal display panel of Embodiment mode 1. As shown in FIG. 2, in the present embodiment mode, three transparent colored layers 10R, 10G, and 10B of red, green, and blue are provided. The transparent colored layers are generally also called color filters, and can color display light by allowing only specific wavelengths of visible light to pass through. By combining transparent colored layers of a plurality of colors, color display is achieved. The region where the transparent colored layers 10R, 10G, and 10B are disposed is mainly used as the pixel aperture area.

The light-shielding layer 12 is generally also known as a black matrix, and is disposed in regions where light-shielding is necessary, such as the regions between the transparent colored layers of different colors, and the regions where wiring and TFTs and the like are disposed. These regions can also be formed without providing the light-shielding layer 12 by stacking the transparent colored layers of a plurality of colors.

In the present embodiment, the laminated spacer 4 is provided in the region where a red transparent colored layer 14R and the light-shielding layer 12 are both disposed. Within the liquid crystal layer 3, the region adjacent to the laminated spacer 4 is often not used as the pixel aperture area, since the liquid crystal orientation is affected by the laminated spacer 4. The common electrode 13 on the laminated spacer 4 is in contact with the opposite substrate 2 in a region where the pixel electrodes 22 are not disposed (inter-electrode region), so as not to come into contact with the pixel electrodes 22 of the opposite substrate 2 and thus cause a short circuit therewith.

The laminated spacer 4 has a configuration in which the light-shielding layer 12, the red transparent colored layer (red spacer layer) 14R, a green transparent colored layer (green spacer layer) 14G, and a blue transparent colored layer (blue spacer layer) 14B are laminated in this order from the side of the support substrate 11. The common electrode 13 is formed so as to cover the surface of the laminated spacer 4. As can be seen from the order of lamination shown in FIG. 1, in the present embodiment, the light-shielding layer 12, the red transparent colored layer 14R, the green transparent colored layer 14G, and the blue transparent colored layer 14B are formed in this order.

In the laminated spacer 4 of the present embodiment, the red spacer layer 14R, the green spacer layer 14G, and the blue spacer layer 14B do not necessarily have to be laminated in that order from the side of the support substrate 11, and the order of lamination may be changed as appropriate.

If the spacer height is insufficient, other resin layers may be included in the laminated spacer 4.

The red spacer layer 14R is formed integrally with the red transparent colored layer (red display part) 10R in the pixel aperture area in the periphery of the laminated spacer 4. The dotted lines in FIG. 1 are boundary lines between the red transparent colored layer 14R of the laminated spacer and the red transparent colored layer 10R in the pixel aperture area. The green spacer layer 14G and the blue spacer layer 14B are separated from the green transparent colored layer (green display part) 10G in the pixel aperture area and the blue transparent colored layer (blue display part) 10B in the pixel aperture area, respectively. The common electrode 13 on the laminated spacer 4 is integrally formed with the common electrode 13 in the pixel aperture area in the periphery of the laminated spacer 4.

Figure 3:
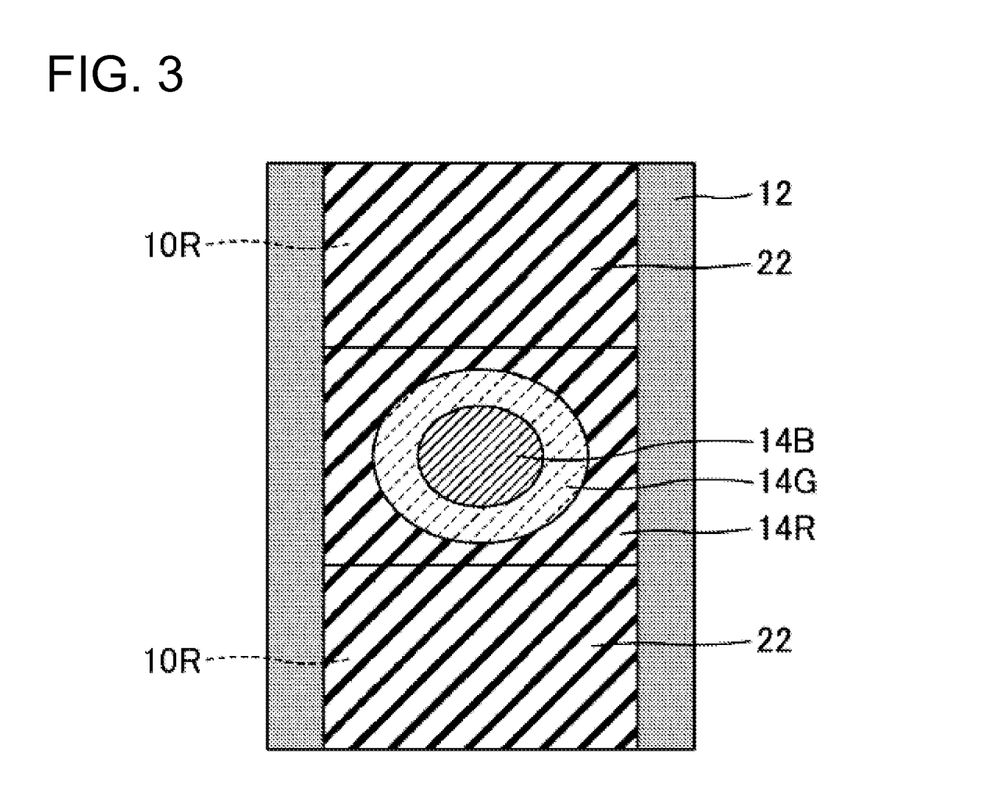
FIG. 3 is a schematic plan view that represents a shape of a laminated spacer when viewing a support substrate from the normal direction.

FIG. 3 is a schematic plan view that represents the shape of the laminated spacer when viewing the support substrate from the normal direction. As shown in FIG. 3, with respect to the red spacer layer 14R, the green spacer layer 14G, and the blue spacer layer 14B, the higher the layer is, the smaller the respective surface area is. In other words, in the laminated spacer, the higher resin layers are formed within the region of the lower resin layers when viewing the support substrate supporting the laminated spacer from the normal direction.

As shown in FIG. 3, of the layers that constitute the laminated spacer, the layers that are not formed integrally with the pixel aperture area (the green spacer layer 14G and the blue spacer layer 14B) are circular when viewing the support substrate supporting the laminated spacer from the normal direction, and each of these layers is formed in a columnar shape.

There is no special limitation on the method of forming the red transparent colored layers 14R and 10R, the green transparent colored layers 14G and 10G, the blue transparent colored layers 14B and 10B, and the black matrix 12. Examples of the method include: a method of coating the support substrate 11 with a photosensitive resin (photoresist) material by using a coater, thereby forming a photosensitive resin (photoresist) film, and thereafter patterning the photosensitive resin (photoresist) film through photolithography; and a method of transferring a photosensitive resin film onto the support substrate 11 by using a dry film provided with the photosensitive resin film on a base material, and thereafter patterning the photosensitive resin film through photolithography.

At this time, the proportion of pigment among the solid content of the color material can be changed in order to adjust the hardness of each layer that constitutes the laminated spacer. Specifically, the higher the pigment concentration within the solid content is, the harder the layer will be. The hardness of each layer can also be adjusted by adding a curing agent to the solid content. Additionally, the hardness of each layer can be adjusted through the baking conditions, the exposure conditions, and the developing conditions.

Because the proportion of deformation of each layer can be adjusted by adjusting the hardness of each layer, by changing the manufacturing conditions of each layer from traditional conditions, the laminated spacer 4 of Embodiment mode 1 can be formed.

In terms of the material for the transparent colored layers 14R, 14G, 14B, 10R, 10G and 10B, and the black matrix 12, a resin material such as a photosensitive resin (photoresist) can be used. Indium tin oxide (ITO), indium zinc oxide (IZO), and the like are examples of materials for the common electrode 13. In this way, the transparent colored layer and the common electrode are generally formed of different materials, and therefore, in the past, the common electrode sustained damage due to not being able to adjust to the deformation of the transparent colored layer.

Multiple examples in which the proportion of deformation of each layer, which constitutes the laminated spacer, is adjusted will be described in detail below.

FIGS. 4 to 7 are cross-sectional drawings that schematically show the result of pressure being applied to the top part of a laminated spacer in each embodiment or comparison example, when a display surface of a liquid crystal display panel is strongly pressed by the finger of a viewer or the like. In particular, display devices of mobile devices, or display devices provided with touch panels sometimes have the display surface of the liquid crystal display panel pressed strongly by the finger of a viewer or the like. In such a case, when a pressing force is applied in the direction of the arrow in FIG. 1, the top part of the laminated spacer 4 receives pressure, and as shown in FIGS. 4 to 7, cracked parts 13a may appear in the common electrode 13.

Embodiment 1

Figure 4:
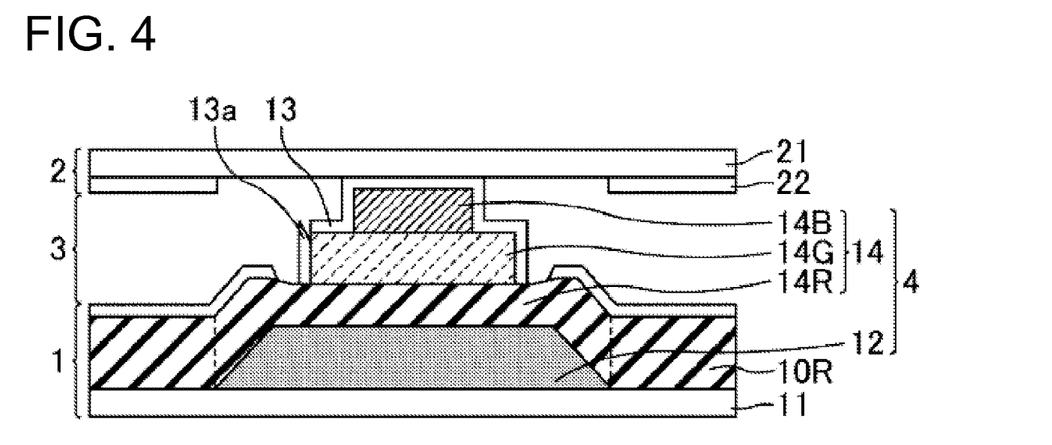

FIG. 4 is a cross-sectional drawing that schematically shows the result of pressure being applied to the top part of the laminated spacer when the display surface of the liquid crystal display panel of Embodiment 1 is strongly pressed by the finger of a viewer or the like. A laminated spacer 4 in Embodiment 1 is designed such that when a certain amount of pressing force is applied to a support substrate 11 in a color filter substrate 1, the degree of deformation of a blue spacer layer 14B is at most 5% of the degree of deformation of the entire laminated spacer 4, and the degree of deformation of a green spacer layer 14G is at most 15% of the degree of deformation of the entire laminated spacer 4. Also, in Embodiment 1, the proportion of deformation of a red spacer layer 14R is particularly large; the degree of deformation of the red spacer layer 14R is at least 50% of the degree of deformation of the entire laminated spacer 4.

If the proportion of deformation of the red spacer layer 14R is sufficiently large and the proportion of deformation of the green spacer layer 14G and the blue spacer layer 14B is sufficiently small, then when a certain amount of pressure is applied to the top part of the laminated spacer 4, the distance between the common electrode 13 on the green spacer layer 14G and the surface of the opposite substrate 2, along with the distance between the common electrode 13 on the blue spacer layer 14B and the surface of the opposite substrate 2 can be prevented from shrinking, which means that a sufficient distance therebetween can be guaranteed. This means that leaks between the common electrode 13 and pixel electrodes 22 are unlikely to occur.

Also, based on the same conditions, when a certain pressure is applied to the top portion of the laminated spacer 4, the common electrode 13 on the green spacer layer 14G and the common electrode 13 on the blue spacer layer 14B are not susceptible to cracks. The blue spacer layer 14B is the transparent colored layer closest to the opposite substrate 2 and the green spacer layer 14G is the second closest layer thereto. According to this configuration, the possibility of leaks can be reduced between the common electrode 13 on the blue spacer layer 14B and the pixel electrodes 22, and between the common electrode 13 on the green spacer layer 14G and the pixel electrodes 22.

Since the proportion of deformation of the green spacer layer 14G and the blue spacer layer 14B is small, the proportion of deformation of the other resin layers is large, and the common electrode 13 on the green spacer layer 14G or on the red spacer layer 14R is more susceptible to cracks. However, even if the cracked parts 13a form in these parts of the common electrode 13, the cracked parts are small as shown in FIG. 4, and are sufficiently far from the surface of the opposite substrate 2, and therefore, leaks between the cracked parts 13a of the common electrode 13 and the pixel electrodes 22 are unlikely to occur.

Therefore, the liquid crystal display panel of Embodiment 1 can prevent leaks from occurring between the common electrode 13 covering the laminated spacer 4 and the pixel electrodes 22, thus minimizing the occurrence of display defects.

Embodiment 2

Figure 5:
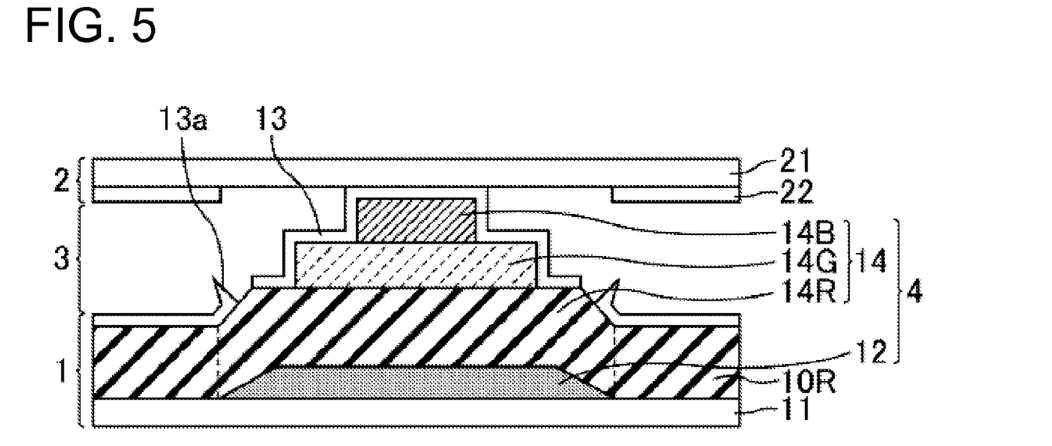

FIG. 5 is a cross-sectional drawing that schematically shows the result of pressure being applied to the top part of the laminated spacer when a display surface of a liquid crystal display panel of Embodiment 2 is strongly pressed by the finger of a viewer or the like. A laminated spacer 4 of Embodiment 2 is designed such that when a certain amount of pressing force is applied to a support substrate 11 in a color filter substrate 1, the degree of deformation of a blue spacer layer 14B is at most 5% of the degree of deformation of the entire laminated spacer 4, and the degree of deformation of a green spacer layer 14G is at most 15% of the degree of deformation of the entire laminated spacer 4. Also, in Embodiment 2, the proportion of deformation of a black matrix 12 is particularly large; the degree of deformation of the black matrix 12 is at least 50% of the degree of deformation of the entire laminated spacer 4.

If the proportion of deformation of the black matrix 12 is sufficiently large and the proportion of deformation of the green spacer layer 14G and the blue spacer layer 14B is sufficiently small, then when a certain pressure is applied to the top portion of the laminated spacer 4, the distance between a common electrode 13 on the green spacer layer 14G and the surface of an opposite substrate 2, along with the distance between the common electrode 13 on the blue spacer layer 14B and the surface of the opposite substrate 2 can be prevented from shrinking, which means that a sufficient distance therebetween can be guaranteed. This means that leaks between the common electrode 13 and pixel electrodes 22 are unlikely to occur.

Since the proportion of deformation of the green spacer layer 14G and the blue spacer layer 14B is small, the proportion of deformation of the black matrix 12 is large, and as shown in FIG. 5, the common electrode 13 on the red spacer layer 14R is susceptible to cracks. However, the red spacer layer 14R is the furthest from the opposite substrate 2 and a sufficient distance therebetween is guaranteed to begin with. Therefore, even if the cracked parts 13a do appear in the common electrode on the red spacer layer 14R, leaks are unlikely to occur between the cracked parts 13a of the common electrode 13 and the pixel electrodes 22.

Therefore, the liquid crystal display panel of Embodiment 2 can prevent leaks from occurring between the common electrode 13 covering the laminated spacer 4 and the pixel electrodes 22, thus minimizing the occurrence of display defects.

The characteristics of the liquid crystal display panels of Embodiment 1 and Embodiment 2 can be appropriately combined according to need. Also, a liquid crystal display panel that includes characteristics of Embodiment 1 and Embodiment 2 can reduce the possibility of short circuits between the pair of electrodes better than when each embodiment is used on its own.

Comparison Example 1

Figure 6:
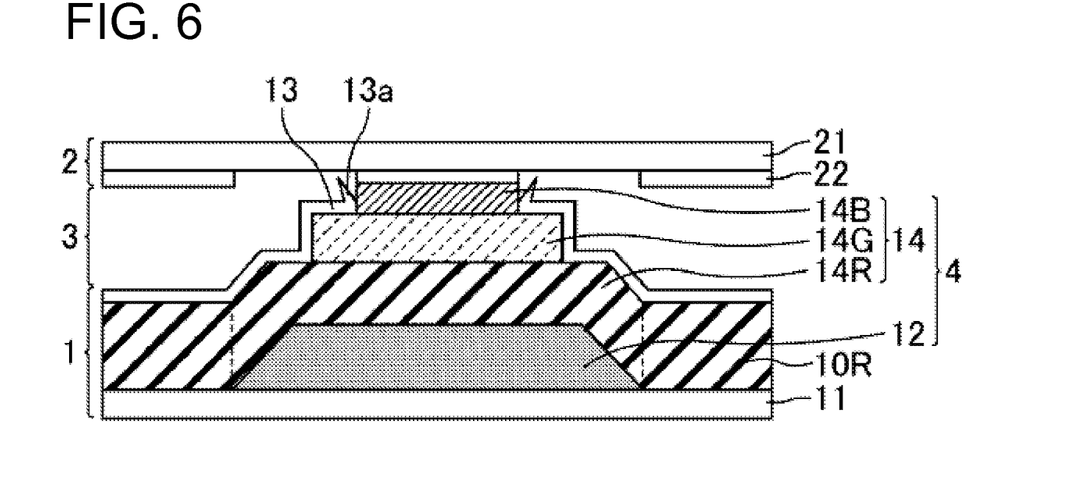

FIG. 6 is a cross-sectional drawing that schematically shows the result of pressure being applied to the top part of a laminated spacer when a display surface of a liquid crystal display panel of Comparison Example 1 is strongly pressed by the finger of a viewer or the like. A laminated spacer 4 of Comparison Example 1 is designed such that when a certain amount of pressing force is applied to a support substrate 11 in a color filter substrate 1, the degree of deformation of a blue spacer layer 14B is greater than 5% of the degree of deformation of the entire laminated spacer 4, and the degree of deformation of a green spacer layer 14G is greater than 15% of the degree of deformation of the entire laminated spacer 4.

If the proportion of deformation of a red spacer layer 14R and a black matrix 12 is smaller than a prescribed quantity and the proportion of deformation of the green spacer layer 14G and the blue spacer layer 14B is larger than a prescribed quantity, then when a certain amount of pressure is applied to the top portion of the laminated spacer 4, the distance between a common electrode 13 on the green spacer layer 14G and the surface of an opposite substrate 2, and the distance between the common electrode 13 on the blue spacer layer 14B and the surface of the opposite substrate 2 both shrink. As a result, leaks are likely to occur between the common electrode 13 on the green spacer layer 14G and pixel electrodes 22, or between the common electrode 13 on the blue spacer layer 14B and the pixel electrodes 22.

If the proportion of deformation of the red spacer layer 14R and the black matrix 12 is smaller than a prescribed quantity and the proportion of deformation of the blue spacer layer 14B is larger than a prescribed quantity, then as shown in FIG. 6, when a certain amount of pressing force is applied to the top part of the laminated spacer 4, the common electrode 13 on the side surfaces of the blue spacer layer 14B peels off, making the cracked parts 13a more likely to appear in the common electrode 13. Because the blue spacer layer 14B is the closest transparent colored layer to the opposite substrate 2, if misalignment occurs between the substrates, for example, a leak is likely to occur between the cracked parts 13a of the common electrode 13 on the blue spacer layer 14B and the pixel electrodes 22.

Therefore, the liquid crystal display panel of Comparison Example 1 has a higher likelihood of leaks occurring between the common electrode 13 covering the laminated spacer 4 and the pixel electrodes 22, thus increasing the likelihood of display defects.

Comparison Example 2

Figure 7:
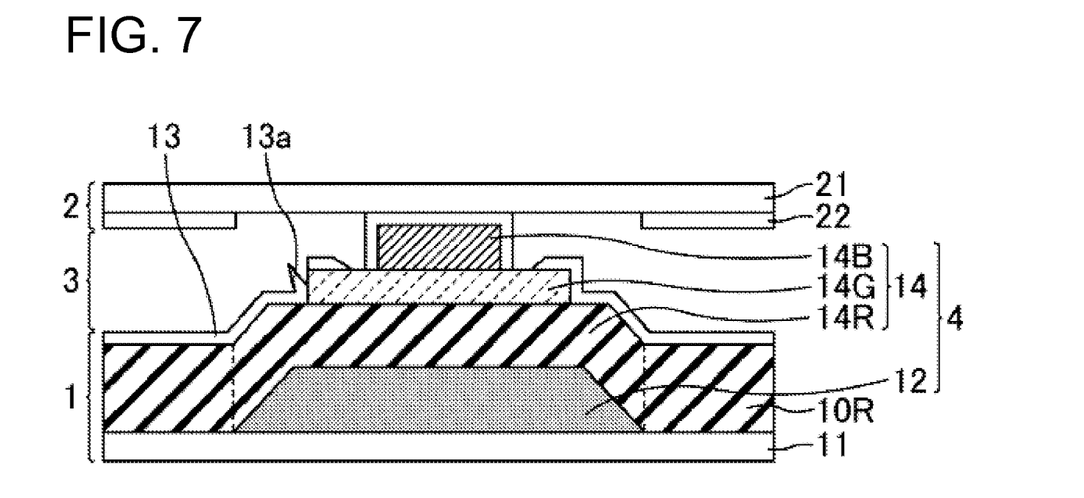

FIG. 7 is a cross-sectional drawing that schematically shows the result of pressure being applied to the top part of a laminated spacer when a display surface of a liquid crystal display panel of Comparison Example 2 is strongly pressed by the finger of a viewer or the like. A laminated spacer 4 of Comparison Example 2 is designed such that when a certain amount of pressing force is applied to a support substrate 11 in a color filter substrate 1, the degree of deformation of a blue spacer layer 14B is greater than 5% of the degree of deformation of the entire laminated spacer 4, and the degree of deformation of a green spacer layer 14G is greater than 15% of the degree of deformation of the entire laminated spacer 4.

If the proportion of deformation of a red spacer layer 14R and a black matrix 12 is smaller than a prescribed quantity and the proportion of deformation of the green spacer layer 14G and the blue spacer layer 14B is larger than a prescribed quantity, then when a certain pressure is applied to the top portion of the laminated spacer 4, the distance between a common electrode 13 on the green spacer layer 14G and the surface of an opposite substrate 2, and the distance between the common electrode 13 on the blue spacer layer 14B and the surface of the opposite substrate 2 both shrink. As a result, leaks are likely to occur between the common electrode 13 on the green spacer layer 14G and pixel electrodes 22, or between the common electrode 13 on the blue spacer layer 14B and the pixel electrodes 22.

If the proportion of deformation of the red spacer layer 14R and the black matrix 12 is smaller than a prescribed quantity and the proportion of deformation of the green spacer layer 14G is larger than a prescribed quantity, then when a certain pressure is applied to the top part of the laminated spacer 4, as shown in FIG. 7, the common electrode 13 on the side surfaces of the green spacer layer 14G peels off, making the cracked parts 13a more likely to appear in the common electrode 13. Because the green spacer layer 14G is the second closest transparent colored layer to the opposite substrate 2, leaks are likely to occur between the cracked parts 13a of the common electrode 13 on the green spacer layer 14G and the pixel electrodes 22.

Therefore, the liquid crystal display panel of Comparison Example 2 has a higher likelihood of leaks occurring between the common electrode 13 covering the laminated spacer 4 and the pixel electrodes 22, thus increasing the likelihood of display defects.

Embodiment Mode 2

Figure 8:
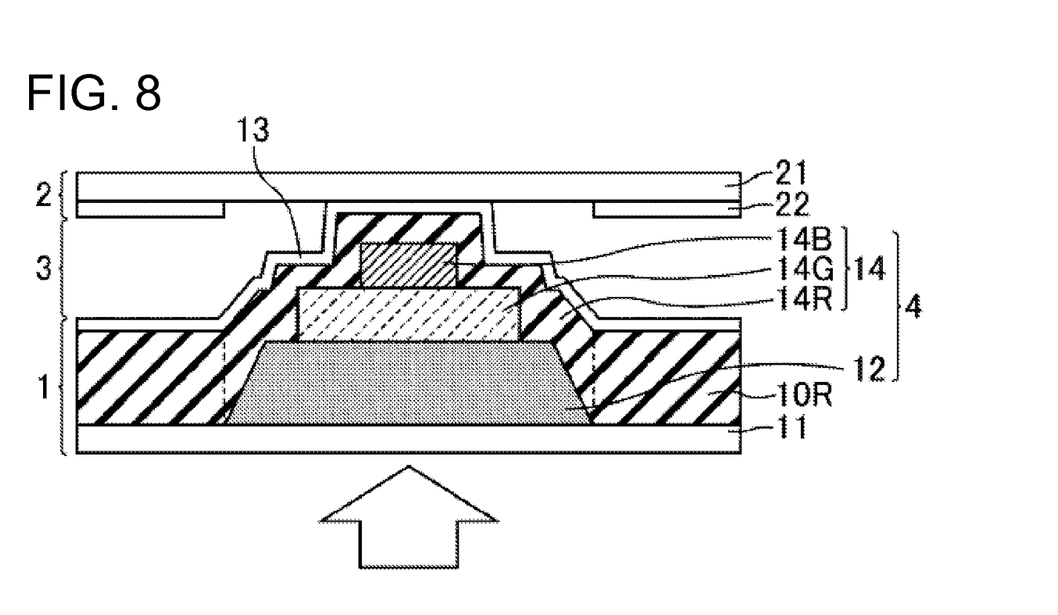
FIG. 8 is a schematic drawing that shows a cross-section of a liquid crystal display panel of Embodiment mode 2.

FIG. 8 is a schematic drawing that shows the cross-section of a liquid crystal display panel of Embodiment mode 2. The liquid crystal display panel of Embodiment mode 2 is the same as the liquid crystal display panel of Embodiment mode 1 except that the topmost transparent colored layer in a laminated spacer 4 is formed so as to cover the entirety of the other resin layers in Embodiment mode 2. Also, in Embodiment mode 2, a red transparent colored layer 14R, which constitutes the topmost layer in the laminated spacer 4, is formed integrally with a red transparent colored layer 10R in a pixel aperture area in the periphery.

As shown in FIG. 8, the liquid crystal display panel of the present embodiment mode has a configuration in which a liquid crystal layer 3 is sandwiched between a pair of substrates 1 and 2. The laminated spacer 4 is provided as a member to control the gap between the pair of substrates 1 and 2. The laminated spacer 4 is formed in the color filter substrate 1.

As shown in FIG. 8, the color filter substrate 1 is provided with a support substrate 11 such as a glass substrate, the laminated spacer 4 formed by laminating a light-shielding layer 12 and a plurality of transparent colored layers 14, and a common electrode 13 that covers the laminated spacer 4. An opposite substrate 2 of the present embodiment mode is a thin film transistor array substrate, and is provided with a support substrate 21 and pixel electrodes 22. The respective pixel electrodes 22 are disposed in a plurality of locations so as to correspond to the locations of the color filters of the pixel aperture areas, and the respective pixel electrodes have a prescribed gap therebetween.

Figure 9:
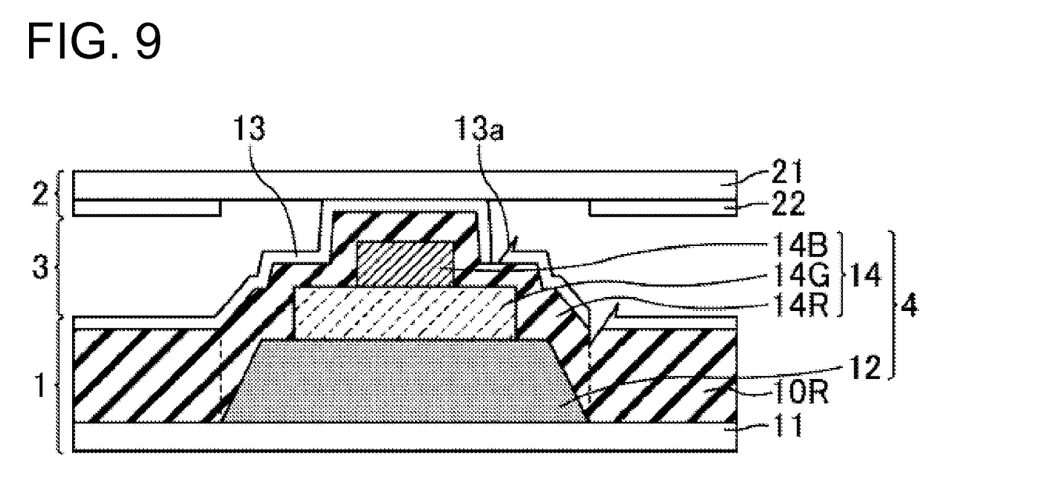
Figure 10:
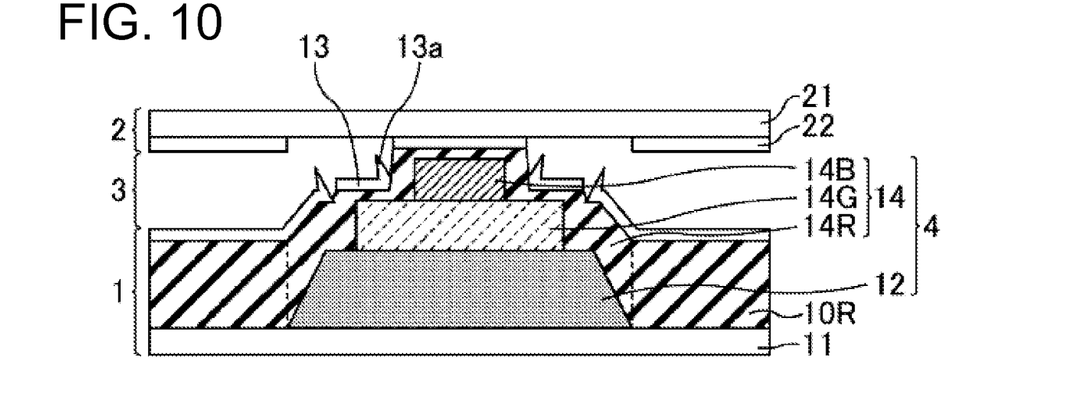

FIGS. 9 and 10 are cross-sectional drawings that schematically show the result of pressure being applied to the top portion of the laminated spacer in each embodiment or comparison example, when a display surface of the liquid crystal display panel is strongly pressed by the finger of a viewer or the like. In particular, in the case of display devices of mobile devices, or display devices provided with touch panels, the display surface of the liquid crystal display panel is sometimes pressed strongly by the finger of a viewer or the like. In such a case, when a pressing force is applied in the direction of the arrow in FIG. 8, the top part of the laminated spacer 4 receives pressure, which may cause the cracked parts 13a to form in the common electrode 13 as shown in FIGS. 9 and 10.

Embodiment 3

FIG. 9 is a cross-sectional drawing that schematically shows the result of pressure being applied to the top part of a laminated spacer, when a display surface of a liquid crystal display panel of Embodiment 3 is strongly pressed by the finger of a viewer or the like. A laminated spacer 4 of Embodiment 3 is designed such that the degree of deformation of a red spacer layer 14R when a certain amount of pressing force is applied to a support substrate 11 in a color filter substrate 1 is at most 5% of the degree of deformation of the entire laminated spacer 4.

If the proportion of deformation of the red spacer layer 14R is sufficiently small, then when the top part of the laminated spacer 4 receives a certain amount of pressure, the red spacer layer 14R is prevented from coming closer to the surface of an opposite substrate 2, and a sufficient distance therebetween is guaranteed. Therefore, leaks between a common electrode 13 and pixel electrodes 22 are unlikely to occur.

When the proportion of deformation of the red spacer layer 14R is sufficiently small and the proportion of deformation of the other resin layers is sufficiently large, then cracks are unlikely to appear in the common electrode 13 on the red spacer layer 14R when a certain amount of pressure is applied to the top part of the laminated spacer 4. In addition, even if cracked parts 13a appear in the common electrode 13 on the red spacer layer 14R, as shown in FIG. 9, the cracks would be small. In the present embodiment, the red spacer layer 14R is the closest transparent colored layer to the opposite substrate 2. Therefore, with this configuration, leaks are unlikely to occur between the cracked parts 13a in the common electrode 13 on the red spacer layer 14R and the pixel electrodes 22.

Therefore, the liquid crystal display panel of Embodiment 3 can prevent leaks from occurring between the common electrode 13 covering the laminated spacer 4 and the pixel electrodes 22, thus minimizing the occurrence of display defects.

Comparison Example 3

FIG. 10 is a cross-sectional drawing that schematically shows the result of pressure being applied to the top part of a laminated spacer when a display surface of a liquid crystal display panel of Comparison Example 3 is pressed strongly by the finger of a viewer or the like. A laminated spacer 4 of Comparison Example 3 is designed such that the degree of deformation of a red spacer layer 14R when a certain amount of pressing force is applied to the support substrate 11 in the color filter substrate 1 is greater than 5% of the degree of deformation of the entire laminated spacer 4.

If the proportion of deformation of the red spacer layer 14R is greater than a prescribed quantity, then a common electrode 13 on the red spacer layer 14R and an opposite substrate 2 come closer to one another when a certain amount of pressure is applied to the top part of the laminated spacer 4. As a result, leaks are likely to occur between the common electrode 13 on the red spacer layer 14R and pixel electrodes 22.

Also, if the proportion of deformation of the red spacer layer 14R is greater than a prescribed quantity, then when a certain pressure is applied to the top part of the laminated spacer 4, as shown in FIG. 10, the common electrode 13 on the red spacer layer 14R is susceptible to cracks. Because the red spacer layer 14R is the closest transparent colored layer to the opposite substrate 2, leaks are likely to occur between the cracked parts 13a in the common electrode 13 on the red spacer layer 14R and the pixel electrodes 22.

Therefore, the liquid crystal display panel of Comparison Example 3 has a higher likelihood of leaks occurring between the common electrode 13 covering the laminated spacer 4 and the pixel electrodes 22, thus increasing the likelihood of display defects.

Embodiment Mode 3

Figure 11:
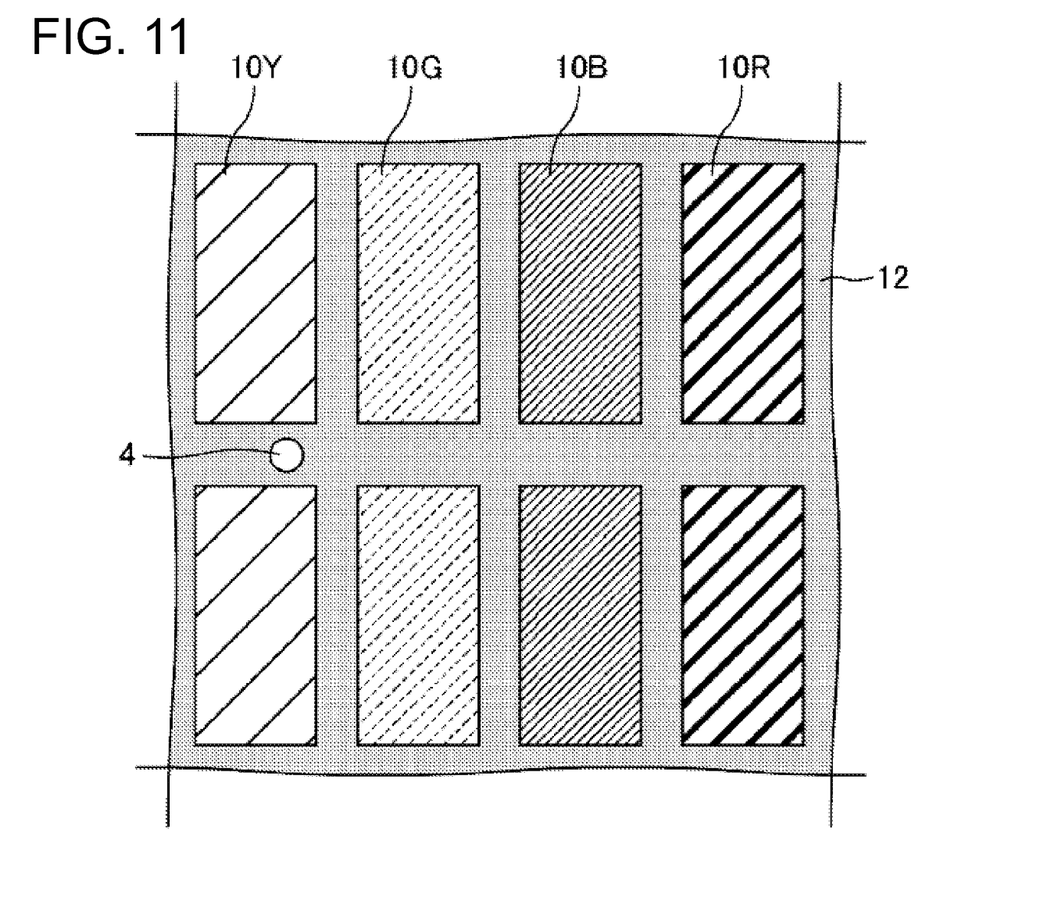
FIG. 11 is a schematic plan view that shows a display surface of a liquid crystal display panel of Embodiment mode 3.

FIG. 11 is a schematic plan view that shows a display surface of a liquid crystal display panel of Embodiment mode 3. The liquid crystal display panel of Embodiment mode 3 uses not only the three colors of red, green, and blue in the display part, but also uses a transparent colored layer in a fourth color yellow, and the yellow transparent colored layer is substituted in for the red transparent colored layer in a laminated spacer. Otherwise, Embodiment mode 3 is the same as Embodiment mode 1. Also, in Embodiment mode 3, the yellow transparent colored layer that constitutes the laminated spacer 4 is formed integrally with a yellow transparent colored layer 10Y in the pixel aperture area in the periphery.

As shown in FIG. 11, the present embodiment mode is provided with transparent colored layers 10R, 10G, 10B, and 10Y, which are colored red, green, blue, and yellow, respectively. By adding yellow, color reproduction can be broadened. The region where the transparent colored layers 10R, 10G, 10B, and 10Y are disposed is generally used as a pixel aperture area.

Figure 12:
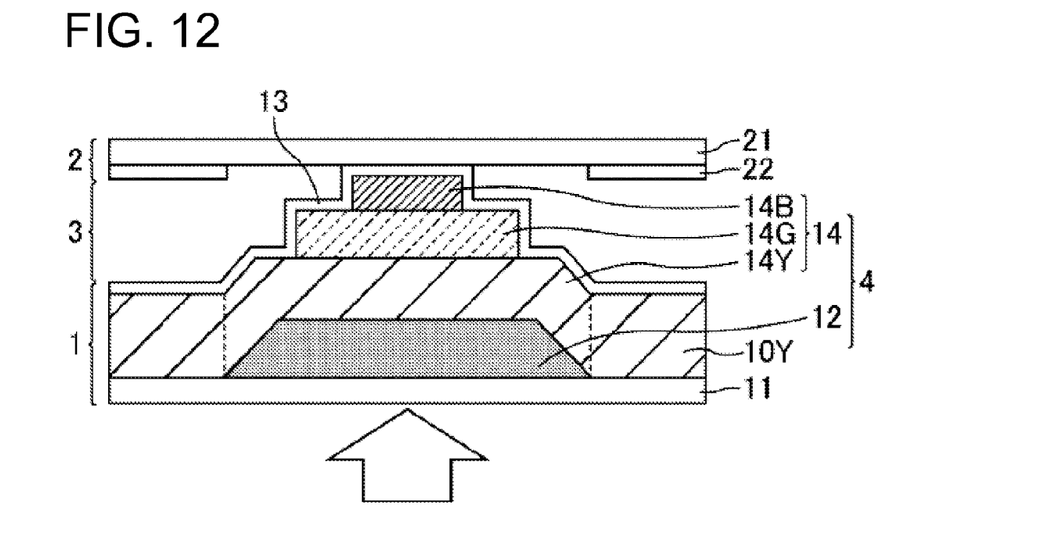
FIG. 12 is a schematic drawing that shows a cross-section of the liquid crystal display panel of Embodiment mode 3.

FIG. 12 is a schematic drawing that shows the cross-section of the liquid crystal display panel of Embodiment mode 3. As shown in FIG. 12, the laminated spacer of Embodiment mode 3 has a configuration in which a light-shielding layer 12, a yellow transparent colored layer (yellow spacer layer) 14Y, a green transparent colored layer (green spacer layer) 14G, and a blue transparent colored layer (blue spacer layer) 14B are laminated in that order from the side of a support substrate 11. A common electrode 13 is formed so as to cover the surface of the laminated spacer 4. As can be seen from FIG. 12, in the present embodiment, the light-shielding layer 12, the yellow transparent colored layer 14Y, the green transparent colored layer 14G, and the blue transparent colored layer 14B are formed in this order.

Evaluative Study

Liquid crystal display panels according to Embodiment 1 and Comparison Example 1 were each made, and studies were done on the proportion of deformation of each of the resin layers that constitute the laminated spacer. When making a liquid crystal display panel, it is generally considered necessary to maintain a margin for the volume of the liquid crystal layer in order to minimize the occurrence of unevenness or air bubbles due to the expansion or contraction of the liquid crystal layer. One standard for making a suitable liquid crystal display panel is to assume that the height of the laminated spacer will deform by 0.2 to 0.3 μm under atmospheric pressure.

The laminated spacer in the liquid crystal display panel used in the present evaluative study maintains a gap between the pair of substrates including the color filter substrate and the opposite substrate, and has a configuration in which the black matrix, the red spacer layer, the green spacer layer, and the blue spacer layer are laminated in this order from the side of the support substrate.

In the present evaluative study, an evaluation was done in which a stick with a tip diameter of 15 mm was pressed against the support substrate in the color filter substrate 1 with a pressing force of 40N (finger analogue condition).

The above-mentioned study was conducted on the liquid crystal display panel of Comparison Example 1, and when the proportion of deformation of each layer was measured using an ultra-micro sized film-hardness gauge, the proportions of deformation were as follows: 35% for the black matrix; 26% for the red spacer layer; 23% for the green spacer layer; and 16% for the blue spacer layer.

The same study was conducted on the liquid crystal display panel of Embodiment 1, and when the proportion of deformation of each layer was measured using the ultra-micro sized film-hardness gauge, the proportions of deformation were as follows: 50% for the black matrix; 30% for the red spacer layer; 15% for the green spacer layer; and 5% for the blue spacer layer.

The thickness of the pixel electrodes provided in the opposite substrate is generally 0.1 μm, and therefore, in the liquid crystal display panel of Embodiment 1, the possibility of a short circuit occurring between the pair of electrodes is greatly reduced, but in the case of the liquid crystal display panel of Comparison Example 1, the possibility of a short circuit occurring between the pair of electrodes is high.

The present application claims priority to Patent Application No. 2010-039304 filed in Japan on Feb. 24, 2010 under the Paris Convention and provisions of national law in a designated State. The entire contents of which are hereby incorporated by reference.

DESCRIPTION OF REFERENCE CHARACTERS 1, 101 color filter substrate
2, 102 opposite substrate
3, 103 liquid crystal layer
4, 104 laminated spacer
10R red transparent colored layer (red display part)
10G green transparent colored layer (green display part)
10B blue transparent colored layer (blue display part)
10Y yellow transparent colored layer (yellow display part)
11, 21, 111, 121 support substrate
12, 112 light-shielding layer (black matrix)
13, 113 common electrode
13a, 113a cracked part
14, 114 transparent colored layer (color filter)
14R, 114R red transparent colored layer (red spacer layer)
14G, 114G green transparent colored layer (green spacer layer)
14B, 114B blue transparent colored layer (blue spacer layer)
14Y yellow transparent colored layer (yellow spacer layer)
22, 122 pixel electrode

The invention claimed is:

1. A liquid crystal display panel including a pair of substrates and a liquid crystal layer sandwiched between the pair of substrates,
wherein one of the pair of substrates comprises a support substrate, a laminated spacer formed by laminating three or more resin layers including a transparent colored layer, and an electrode that covers the laminated spacer;
wherein the other of the pair of substrates comprises a support substrate and electrodes; and
wherein a degree of deformation of a topmost resin layer of the three or more resin layers is at most 5% of a degree of deformation of the laminated spacer as a whole, when a certain amount of pressing force is applied to the support substrate supporting the laminated spacer.

2. The liquid crystal display panel according to claim 1, wherein a degree of deformation of a second resin layer from the top of the three or more resin layers is at most 15% of the degree of deformation of the laminated spacer as a whole, when a certain amount of pressing force is applied to the support substrate supporting the laminated spacer.

3. The liquid crystal display panel according to claim 1, wherein the topmost resin layer of the three or more resin layers is located within an inter-electrode region in the other of the pair of substrates, when viewing a surface of the support substrate supporting the laminated spacer from the normal direction.

4. The liquid crystal display panel according to claim 1, wherein a second resin layer from the top of the three or more resin layers is located within an inter-electrode region in the other of the pair of substrates, when viewing the surface of the support substrate supporting the laminated spacer from the normal direction.

5. The liquid crystal display panel according to claim 1, wherein a proportion of deformation of upper resin layer of the three or more resin layers is smaller than a proportion of deformation of lower resin layers of the three or more resin layers.

6. A liquid crystal display panel including a pair of substrates and a liquid crystal layer sandwiched between the pair of substrates,
wherein one of the pair of substrates comprises a support substrate, a laminated spacer formed by laminating three or more resin layers including a transparent colored layer, and an electrode that covers the laminated spacer;
wherein the other of the pair of substrates comprises a support substrate and electrodes; and
wherein a degree of deformation of a second resin layer from the top of the three or more resin layers is at most 15% of the degree of deformation of the laminated spacer as a whole, when a certain amount of pressing force is applied to the support substrate supporting the laminated spacer.

7. The liquid crystal display panel according to claim 6, wherein a degree of deformation of a topmost resin layer of the three or more resin layers is at most 5% of the degree of deformation of the laminated spacer as whole, when a certain amount of pressing force is applied to the support substrate supporting the laminated spacer.

* * * * *